United States Patent [19]

Holopainen

[11] 4,362,623
[45] Dec. 7, 1982

[54] COFFEE FILTER SYSTEM

[76] Inventor: Vaino J. Holopainen, Cross Rd., P.O. Box 49, East Sullivan, N.H. 03445

[21] Appl. No.: 314,217

[22] Filed: Oct. 23, 1981

Related U.S. Application Data

[63] Continuation of Ser. No. 77,568, Sep. 21, 1979, abandoned.

[51] Int. Cl.³ ............................................. B01D 35/02
[52] U.S. Cl. ......................... 210/493.5; 210/497.01; 210/500.1; 206/499; 206/515
[58] Field of Search ............... 210/474, 497.01, 497.2, 210/483, 496, 493.5, 500.1; 206/217, 499, 515; D12/22; D15/113; 426/77; 55/500; 220/406; 221/309, 310

[56] References Cited

U.S. PATENT DOCUMENTS

| 1,709,168 | 4/1929 | Epperson | 206/217 |
| 1,838,797 | 12/1931 | Town | 282/12 |
| 1,912,860 | 6/1933 | Ranhofer | 220/406 |
| 1,933,468 | 10/1933 | Abbot | 206/217 |
| 2,149,499 | 3/1939 | Bottle | 282/12 |
| 2,209,521 | 7/1940 | Haim | 282/12 |
| 2,218,388 | 10/1940 | Twombly | 206/515 |
| 2,234,397 | 4/1941 | Bentz | 210/16 |
| 3,920,120 | 11/1975 | Shveda | 206/217 |
| 4,220,540 | 9/1980 | Chang | 210/497.1 |

OTHER PUBLICATIONS

Supplement to Home Furnishings Daily-Mr. Coffee.

Primary Examiner—John Adee
Attorney, Agent, or Firm—Blodgett & Blodgett

[57] ABSTRACT

System for packaging cup-like coffee filters, consisting of nesting the filters so that their upper edges form a frusto-conical surface and of providing a tab associated with each filter, so that the innermost filter can be readily separated from the others.

3 Claims, 9 Drawing Figures

COFFEE FILTER SYSTEM

This is a continuation of application Ser. No. 077,568, filed Sept. 21, 1979, abandoned.

BACKGROUND OF THE INVENTION

It is common practice to make coffee in a machine that makes use of a cup-like filter. These filters are formed from flat paper sheet into a cup having a frusto-conical side wall. In forming it, the wall is provided with vertical corrugations or striations. Therefore, the filters are packaged in nested condition, it is difficult to remove the innermost filter. This is because the paper material that is used is of a porous nature (and, therefore, has a rough surface) and because the nesting of the corrugations provides additional contact surface between the innermost filter and the adjacent one in the nest. In other words, the friction is very high. It is necessary, therefore, to separate the edge of the upper edge of the innermost filter from the remainder and, since they are closely nested, this is difficult to do. Sometimes, even when one uses his finger nail, he peels off a group of two or three instead of the single filter that is desired. These and other difficulties experienced with the prior art devices have been obviated in a novel manner by the present invention.

It is therefore, an outstanding object of the invention to provide a coffee filter system in which the innermost filter of a nested assemblage can easily be removed.

Another object of this invention is the provision of a system for packaging coffee filters, wherein each filter is provided with its own separate lifting means.

A further object of the present invention is the provision of a coffee filter system which is simple in construction, which is inexpensive to manufacture, and which will not deteriorate during long storage.

It is another object of the instant invention to provide a system for packaging cup-like coffee filters and for adding individual tabs to the filters to permit the ready release of the innermost filter from the remainder.

A still further object of the invention is the provision of a coffee filter package in which the natural inclination of the upper edges of a plurality of nested filters assists in locating individual tabs for the removal of a single filter.

With these and other objects in view, as will be apparent to those skilled in the art, the invention resides in the combination of parts set forth in the specification and covered by the claims appended hereto.

SUMMARY OF THE INVENTION

In general, the invention consists of a coffee filter system including a plurality of cup-like disposable filters, each having a generally circular bottom wall and a generally frusto-conical side wall. A tab is associated with each filter and extends above the upper edge of the side wall to permit the separation and removal of the innermost filter from the others.

More specifically, the filters are nested so that their top edges lie along a generally frusto-conical surface, so that the tabs are easier to grasp, thus assisting in the separation of the innermost filter from the nest by the grasping tab.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
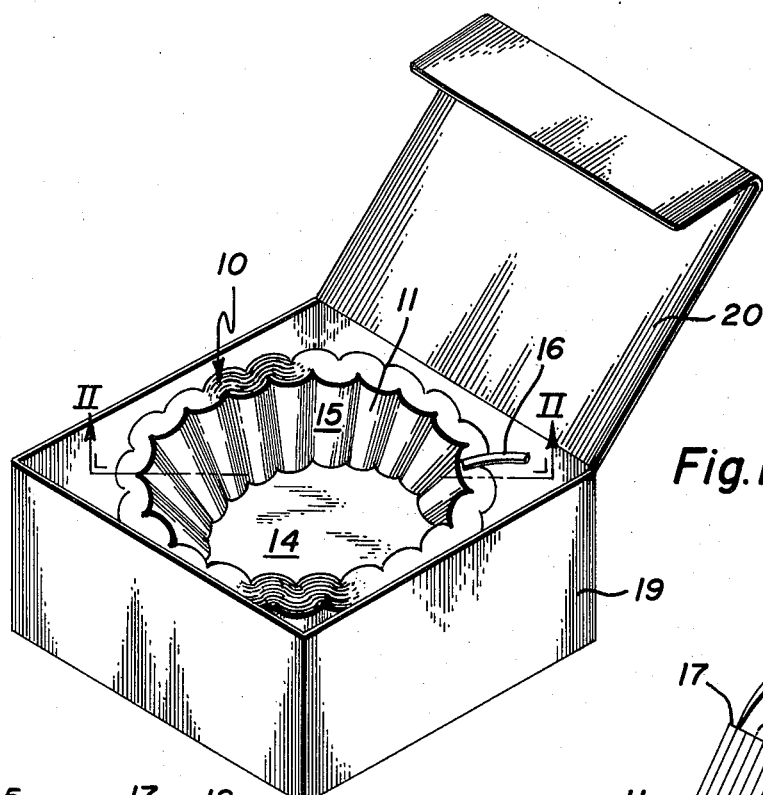
FIG. 1 is a perspective view of a coffee filter system incorporating the principles of the present invention.

Referring first to FIG. 1, wherein are best shown the general features of the invention, the coffee filter system, indicated generally by the reference numeral 10, is shown as consisting of a plurality of cup-like disposable filters 11, 12, 13, etc., each having a generally circular bottom wall 14 and a generally frusto-conical side wall 15. A tab 16 is associated with the innermost filter and extends above the upper edge 17 of the side wall 15 to permit the separation of the filter 11 from the other filters 12, 13, etc., and its removal from the group.

Figure 2:
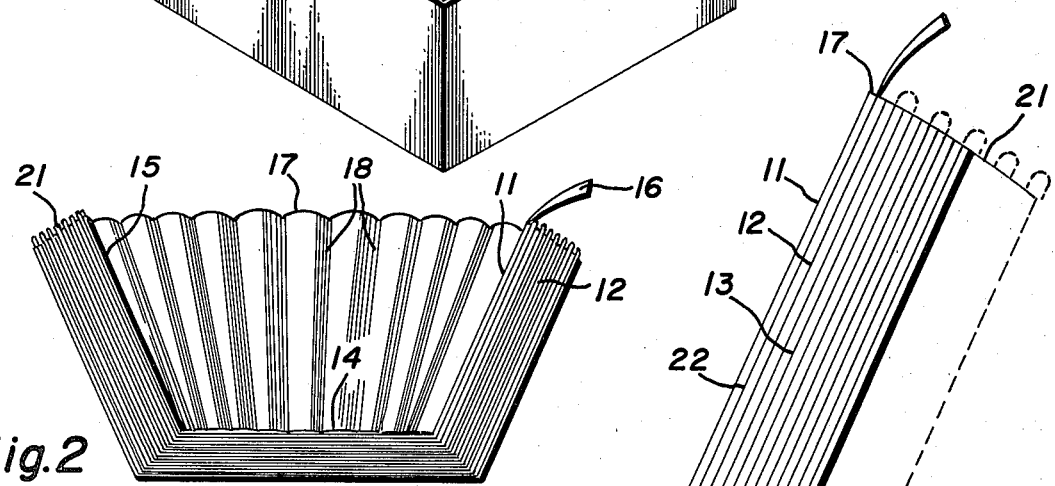
FIG. 2 is a sectional view of the filter system taken on the line II—II of FIG. 1.
Figure 3:
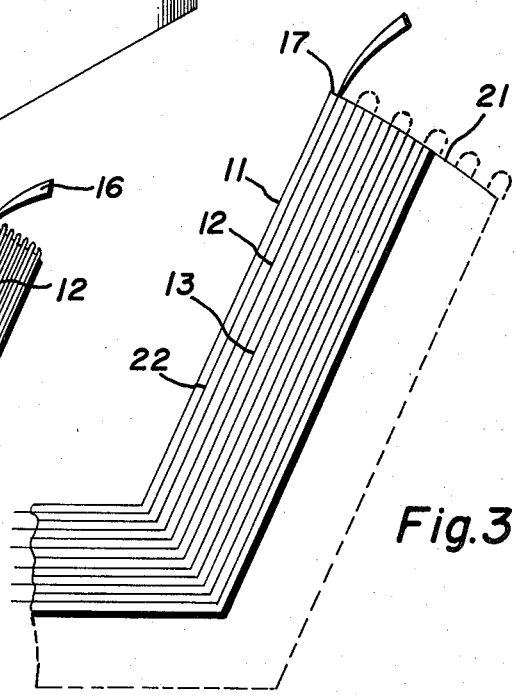
FIG. 3 is an enlarged view of a portion of the system.

As is evident in FIGS. 2 and 3, the filter 11 and the others are all formed from a flat sheet. The side wall 15 is provided with vertical corrugations 18 assisting in forming the flat sheet into a frusto-conical shape. The nested group of filters 11, 12, 13, etc., is snugly carried in an open-top container 19 having a closable hinged cover 20. As is most evident in FIG. 2, nesting of the filters causes their top edges 17 to lie along a generally conical surface 21 that inclines downwardly and upwardly of the stack, thus assisting in the separation of the innermost filter from the nest when the tab 16 is pulled.

FIGS. 2 and 3, the tab is shown as part of an elongated element 22 that is sinuously threaded from one side to another of the plurality of filters, so that, as the tab 16 is pulled upwardly, the element 22 lifts the filters one at a time from the inside.

Figure 5:
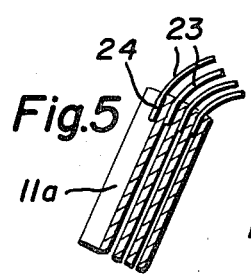
FIG. 5 is a sectional view of the invention taken on the line V—V of FIG. 4.
Figure 4:
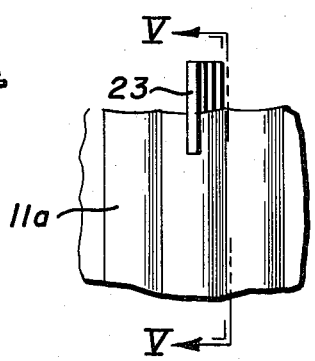
FIG. 4 is an elevational view of a portion of a modified form of the invention.

According to modified form of the invention shown in FIGS. 4 and 5, an individual tab 23 is fastened by an adhesive layer 24 to the side wall of the filter 11a. The lower part of the tab is fastened to the upper portion of the side wall adjacent the upper edge thereof and the upper part of the tab extends upwardly above the upper edge of the side wall. As is evident in FIG. 4, the tabs 23 are located along the upper edges of the filters at successively greater distances from the location of the tab of the innermost filter, so that the tabs are shingled and are easy to grasp one at a time.

Figure 6:
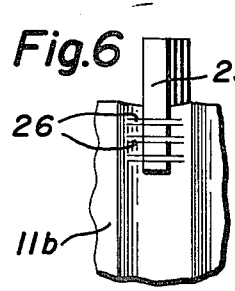
FIG. 6 is an elevational view of another form of the invention.

Referring to FIG. 6, in that view an individual tab 25 is fastened by a mechanical interlocking means or creases 26 to the side wall of the filter 11b, this mechanical interlocking taking the form of the so-called "paper weld". In this case the lower part of the tab is fastened to the upper portion of the side wall adjacent the upper edge thereof and the upper part of the tab extends upwardly above the upper edge of the side wall.

Figure 7:
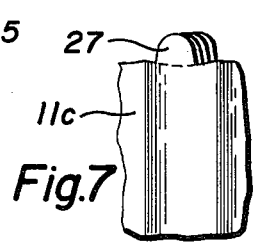
FIG. 7 is an elevational view of a still further form of the invention.

FIG. 7 shows a variation of the invention in which an individual tab 27 is integrally formed with and extends from the upper edge of the side wall of the filter 11c. The tabs are located in a staggered manner, so that the tab of the innermost filter is easily separated from the others for the withdrawal of that single filter.

Figure 8:
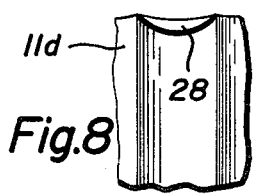
FIG. 8 is an elevational view of another modification of the invention.

In FIG. 8 is shown a variation of the invention in which the tab 28 is integrally formed from the upper edge of the side wall of the 11b. The tab is in the form of an inwardly and downwardly-directed flange provided by deforming the edge of the filter inwardly and downwardly. In this form of the invention only the tab of the innermost filter is exposed at any given time.

Figure 9:
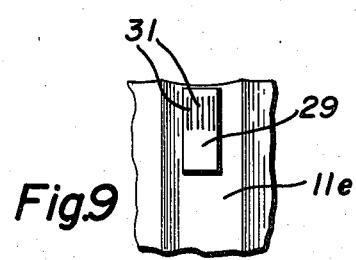
FIG. 9 is an elevational view of a still further form of the invention.

FIG. 9 shows a variation of the invention in which a tab 29 is fastened to the filter 11e by the mechanical interlocking method known as "taper weld". In this case, however, the creases 31 are vertically arranged and the tab extends downwardly into the filter rather than upwardly. In this case only the tab of the innermost filter is exposed at any given time.

The operation of the invention and its advantages will now be readily understood in view of the above description. In connection with the version of the invention shown in FIGS. 1, 2, and 3, it can be seen that the initial upward pulling of the tab 16 will cause the innermost filter 11 to rise vertically and away from the others, so that it can be easily grasped for use. As the filters are successively pulled from the nested group, the tab 16, of course, becomes very long and maybe torn off to a shorter length as desired. The advantage of this construction is that the tab does not remain with the filter.

In FIG. 4 the grasping of each individual tab 23 causes its filter to rise. In order to assure that the innermost filter is pulled at any given time, the tabs are kept together in a group (as is obvious in FIG. 4) and in order to make it easy to separate the innermost tab 23 from the others a shingling operation is desirable.

The version of the invention shown in FIG. 7 operates in a similar manner, i.e., the grasping of the innermost tab 27 removes the innermost filter in a desirable manner. Because the tabs are slightly staggered or shingled, as is evident in the drawing, it is easy to separate the innermost tab from the others.

The version shown in FIG. 8 requires no separation of the innermost tab from the others because only the tab of the innermost filter is available at any given time. It requires only the placement of a fingernail under the tab to lift the innermost filter 3.

The version of the invention shown in FIG. 9 has the advantage that only the innermost tab 29 is available at any given time and operates by a placement of the fingernail under the tab to withdraw the innermost filter for use.

It can be seen, then, that the use of the present invention provides a convenient way of removing the filters one at a time without the problem of lifting more than one filter at a time or the necessity of wetting one's finger or similar well-known expedients. The cost of adding the tabs to the package is quite small and renders the coffee filter system very useful and convenient.

It is obvious that minor changes may be made in the form and construction of the invention without departing from the material spirit thereof. It is now, however, desired to confine the invention to the exact form herein shown and described, but it is desired to include all such as properly come within the scope claimed.

The invention having been thus described, what is claimed as new and desired to secure by Letters Patent is:

1. Coffee filter system, comprising:
   (a) a plurality of cup-like disposable filters, each filter having a generally circular bottom wall and a generally frusto-conical side wall, said filters being arranged in a nested stack, and
   (b) a continuous elongated tab element that is threaded sinuously from one side to another of the plurality of filters to form a tab associated with the innermost filter and which is accessible for grasping by the fingers of a user, so that, as the tab is pulled upwardly, the element lifts the filters one at a time from the remaining filters in the stack, 2. Coffee filter system as recited in claim 1, wherein the filter is formed from flat sheet and the side wall is provided with vertical corrugations.

3. Coffee filter systems as recited in claim 2, wherein the nesting of the filters causes their top edges to lie along a generally conical surface that inclines downwardly and outwardly, thus assisting in the separation of the innermost filter from the nest.

* * * * *